C. D. McAFEE.
RAIL FASTENER AND BOND.
APPLICATION FILED MAR. 12, 1909.

941,332.

Patented Nov. 23, 1909.

Witnesses
A. H. Rabsag,
K. H. Buller.

Inventor
C. D. McAfee

By H. C. Evert & Co.
Attorneys

UNITED STATES PATENT OFFICE.

CHARLES D. McAFEE, OF BURGETTSTOWN, PENNSYLVANIA.

RAIL FASTENER AND BOND.

941,332.  Specification of Letters Patent.  Patented Nov. 23, 1909.

Application filed March 12, 1909. Serial No. 482,882.

*To all whom it may concern:*

Be it known that I, CHARLES D. MCAFEE, a citizen of the United States of America, residing at Burgettstown, in the county of Washington and State of Pennsylvania, have invented certain new and useful Improvements in Rail Fasteners and Bonds, of which the following is a specification, reference being had therein to the accompanying drawing.

This invention relates to a rail fastener and bond for rail joints, and the object of the invention is the provision of novel means in connection with the splice bars of a rail joint for positively retaining the splice bars in engagement with the confronting ends of two rails, and at the same time establish electrical connection between said rails, whereby railway signals can be transmitted from tower to tower and block to block.

Another object of this invention is to provide a combined nut lock and rail bond which will positively insure an electrical connection between the rails and at the same time prevent nuts from becoming accidentally displaced due to vibratory stresses and strains exerted upon the confronting ends of two rails by rolling stock passing over the same.

With the above and other objects in view which will more readily appear as the invention is better understood, the same consists in the novel construction, combination and arrangement of parts to be hereinafter described and then specifically claimed.

Figure 1:
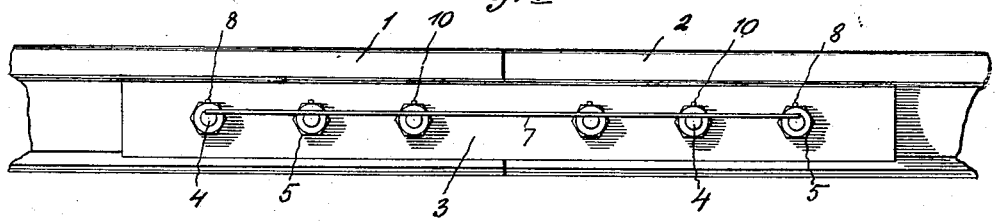
Figure 2:
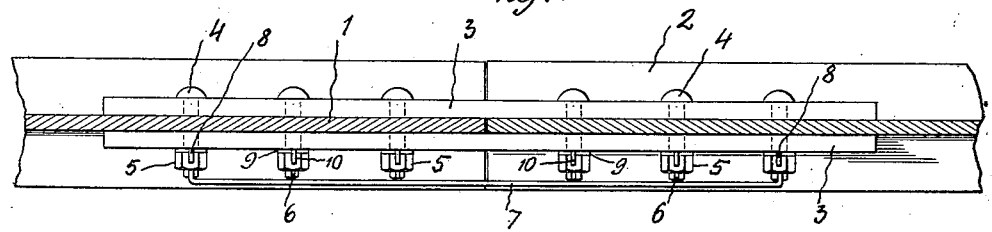
Figure 3:
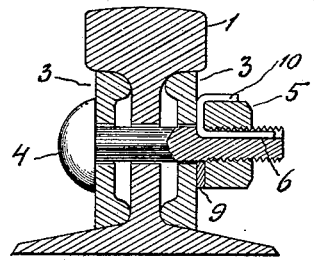
Figures 4, 5:
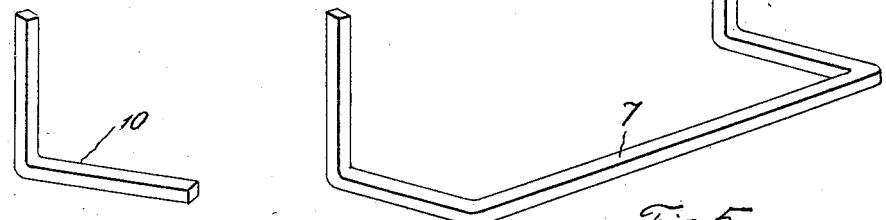
Figure 6:
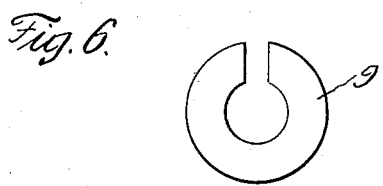

Referring to the drawings:—Figure 1 is a side elevation of a rail joint constructed in accordance with my invention, Fig. 2 is a horizontal sectional view of the same, Fig. 3 is an enlarged cross sectional view of the rail joint, Fig. 4 is a perspective view of a nut lock forming part of my invention, Fig. 5 is a perspective view of a combined nut lock and yoke, and Fig. 6 is a front elevation of a washer used in connection with the rail fastener.

In the drawings, 1 and 2 designate rails having the confronting ends thereof connected by splice bars 3 bracing the web portions and heads of said rails, said splice bars being held in engagement with said rails by bolts 4 and nuts 5 screwed upon said bolts.

My invention resides in providing the bolts 4 with longitudinal grooves 6, and in said grooves arrange malleable nut locks for holding the nuts 5 upon the bolts 4 and preventing said nuts from becoming accidentally displaced. The nut locks used in connection with the outer and end-most bolts comprise a yoke 7 having the ends thereof bent upwardly, as at 8, to engage between the split ends of washers 9 placed upon said bolts prior to the nuts 5, the upwardly bent ends of the yoke being bent down into engagement with the nuts 5 to prevent said nuts from rotating, while the yoke 7 engages in the groove 6 of the end-most bolts 4. The washers 9 are also used in connection with the bolts 4 intermediate the end-most bolts, and the nut locks used with these intermediate bolts comprise L-shaped bars having one end thereof engaging in the grooves 6 of the bolts, while the opposite ends of the bars are bent to engage the nuts 5 and prevent said nuts from rotating. In both instances, it will be observed that the washers assist the bolts in retaining the nut locks in position, and that when the nut locks are properly positioned and sealed, it will be impossible for a vibratory movement of the bolts to work the nuts off of said bolts. With the nuts properly tightened, particularly in connection with the end-most bolts, a positive electrical connection will be established through the medium of the yoke 7, irrespective of the expansion and contraction of the confronting ends of said rails.

The simplicity of the rail fastener and bond permits the joint being easily and quickly established by unskilled labor, besides the cost of manufacture being reduced to a minimum, by reason of the fact that the nut locks can be easily opened to permit of the nuts being removed and said nuts and the bolts again used in connection with another rail joint.

While in the drawings forming a part of this application there is illustrated the preferred embodiments of my invention, I would have it understood that the detail construction thereof can be varied or changed as to shape, proportion and manner of assemblage without departing from the spirit of the invention.

Having now described my invention what I claim as new, is:—

1. In a rail fastener and bond, the combination with the confronting ends of two rails, splice bars bracing said rails, bolts extending through said splice bars and said rails, said bolts having longitudinal grooves formed therein, and nuts adapted to screw upon said bolts, of split washers mounted upon said bolts, a yoke mounted in the grooves of the outer-most bolts and adapted to have the ends thereof extend upwardly between the split ends of the outer-most washers and bent over to engage the outer-most nuts upon said bolts, and bars mounted in the grooves of the other of said bolts and adapted to extend upwardly between the split ends of the washers of said bolt and bent over into engagement with the nuts of said bolts, substantially as described.

2. In a rail fastener and bond, the combination with rails, splice bars bracing the confronting ends of said rails, bolts extending through said splice bars and rails, said bolts having grooves formed therein, nuts adapted to screw upon said bolts, of split washers mounted upon said bolts, and a yoke, said yoke having the ends thereof mounted in the grooves of said bolts and extending upwardly between the split ends of said washers and bent to engage the nuts screwed upon said bolts, substantially as described.

In testimony whereof I affix my signature in the presence of two witnesses.

CHARLES D. McAFEE.

Witnesses:
L. D. STOTTLEMYER,
W. B. SIMS.